United States Patent
Egger et al.

(10) Patent No.: US 12,171,245 B2
(45) Date of Patent: Dec. 24, 2024

(54) SHELF STABLE CONFECTION

(71) Applicant: General Mills, Inc., Minneapolis, MN (US)

(72) Inventors: Michelle Egger, Plymouth, MN (US); Jeffrey F Enz, Minneapolis, MN (US); Ally M Rindt, Cottage, MN (US); Phillippe A Vandeweghe, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 937 days.

(21) Appl. No.: 17/047,555

(22) PCT Filed: May 18, 2018

(86) PCT No.: PCT/US2018/033460
§ 371 (c)(1),
(2) Date: Oct. 14, 2020

(87) PCT Pub. No.: WO2019/221749
PCT Pub. Date: Nov. 21, 2019

(65) Prior Publication Data
US 2021/0145018 A1    May 20, 2021

(51) Int. Cl.
| | |
|---|---|
| A23G 1/48 | (2006.01) |
| A23G 1/32 | (2006.01) |
| A23G 1/36 | (2006.01) |
| A23G 1/54 | (2006.01) |
| A23L 19/00 | (2016.01) |
| A23L 25/00 | (2016.01) |

(52) U.S. Cl.
CPC ............... *A23G 1/48* (2013.01); *A23G 1/325* (2013.01); *A23G 1/36* (2013.01); *A23G 1/54* (2013.01); *A23L 19/09* (2016.08); *A23L 25/30* (2016.08); *A23V 2002/00* (2013.01)

(58) Field of Classification Search
CPC . A23G 1/48; A23G 1/325; A23G 1/36; A23G 1/54; A23L 19/09; A23L 25/30
See application file for complete search history.

(56) References Cited

U.S. PATENT DOCUMENTS

| 9,005,685 B2 | 4/2015 | Cotton et al. |
| 10,207,419 B2 | 2/2019 | Harder et al. |
| 2014/0154364 A1* | 6/2014 | Cotton .................... A23L 19/09 |
| | | 426/302 |

FOREIGN PATENT DOCUMENTS

| CN | 101703107 | 5/2010 |
| CN | 107751904 | 3/2018 |
| GB | 2468692 | 9/2010 |

(Continued)

OTHER PUBLICATIONS

English translation CN101703107B Nov. 21, 2012 (Year: 2012).*

(Continued)

*Primary Examiner* — Katherine D Leblanc
(74) *Attorney, Agent, or Firm* — Jordan IP Law, LLC; Rachel A. Kahler

(57) ABSTRACT

A food product made with simple ingredients, including fruit paste and cocoa butter-based particles, is disclosed. The food product is shelf stable and provides an eating experience resembling a chocolate truffle. Methods of making a food product are also described.

18 Claims, 1 Drawing Sheet

(56) References Cited

FOREIGN PATENT DOCUMENTS

WO     WO 2017/172413     10/2017

OTHER PUBLICATIONS

"Paste" definition from Cambridge Dictionary . Retrieved Dec. 30, 2023. https://dictionary.cambridge.org/us/dictionary/english/paste (Year: 2023).*

McCord, Catherine. "PB&J Yogurt Swirl" Aug. 24, 2010 (Year: 2010).*

"Dark Chocolate Coconut Energy Balls" Oct. 30, 2017 https://web.archive.org/web/20191002030548/https://pumpkinandpeanutbutter.com/2017/10/30/dark-chocolate-coconut-energy-balls/ (Year: 2017).*

"Finding the Right Type of Cocoa Powder" Apr. 5, 2017 https://www.global-organics.com/post.php?s=2017-04-05-finding-the-right-type-of-cocoa-powder (Year: 2017).*

"Raw Brownie Bites" Sep. 19, 2017 https://web.archive.org/web/20170919081053/https://detoxinista.com/raw-brownie-bites-vegan-paleo/ (Year: 2017).*

\* cited by examiner

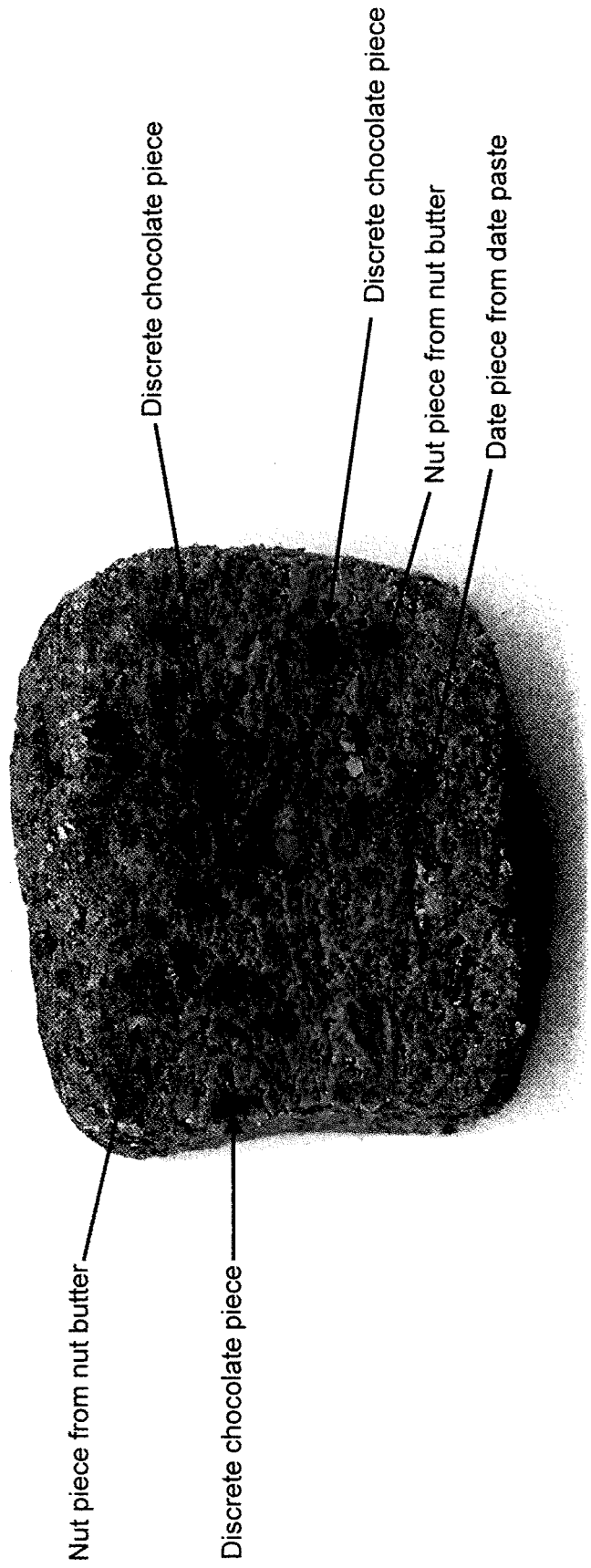

ial mouthfeel, and simple ingredients.

SHELF STABLE CONFECTION

CROSS-REFERENCE TO RELATED APPLICATIONS

This application represents a National stage application of PCT/US2018/033460, entitled "Shelf Stable Confection", filed May 18, 2018, pending. The entire content of this application is incorporated by reference.

BACKGROUND

Consumers are increasingly looking for new and interesting eating experiences. Consumers also expect foods with fewer and/or simpler ingredients, while still retaining the convenience of shelf-stability. Thus, a new challenge has been to produce foods that fulfill the need for enjoyable, stable, yet simple foods.

SUMMARY

The present disclosure relates to a shelf-stable confection.

Provided herein is a food product. A food product includes discrete cocoa butter-based particles having a size of −14+140 embedded in a matrix that includes a fruit paste, a fat, and sufficient solids to prevent significant oil migration out of the food product.

In some embodiments, a fruit paste in a food product provided herein can have a water activity of less than 0.73. In some embodiments, a fruit paste can be a date paste.

In some embodiments, the matrix of a food product provided herein can include a fruit paste in an amount of about 33% to about 51% by weight of the food product, and a fat in an amount of about 21% to about 31% by weight of the food product.

In some embodiments, the matrix of a food product provided herein can include about 40% to about 65% by weight of a mixture consisting of the fruit paste and a nut butter, where the mixture includes the fruit paste in an amount of about 40% to about 70% by weight of the mixture, with the balance of the mixture being the nut butter.

In some embodiments of a food product provided herein, at least a portion of the fat can be provided by the nut butter.

In some embodiments, a food product provided herein includes discrete cocoa butter-based particles in an amount of from about 25% to about 40% by weight of the food product. In some embodiments, discrete cocoa butter-based particles in a food product provided herein can be chocolate.

In some embodiments, the matrix of a food product provided herein can include cocoa powder. The matrix in a food product provided herein can, in some embodiments, include cocoa powder in an amount of about 7% to about 15% by weight of the food product. In some embodiments, cocoa powder in a food product provided herein can have a fat content of from about 10% to about 22% by weight of the cocoa powder.

In some embodiments, a food product provided herein can be portioned into pieces that weigh from about 5 g to about 10 g.

In some embodiments, a food product provided herein can have a dry coating, such as cocoa powder, carob powder, sugar, nut flour, or coconut pieces, on at least a portion of the surface of the food product.

In some embodiments, a food product provided herein can consist essentially of a matrix consisting essentially of a fruit paste, a nut butter, and cocoa powder, discrete cocoa butter-based particles embedded in the matrix, and a dry coating on at least a portion of the surface of the food product. In some embodiments, the fruit paste can include a date paste. In some embodiments, the nut butter can include almond butter and/or peanut butter. In some embodiments, the cocoa butter-based particles can be chocolate. In some embodiments, the dry coating can include carob powder, cocoa powder, powdered sugar, a starch, a nut flour, or any combination thereof.

Methods of making a food product are also provided herein. A method of making a food product includes combining matrix ingredients and cocoa butter-based particles to form a food composition, and forming the food composition into pieces to produce the food product, the food product comprising discrete cocoa butter-based particles embedded in a matrix that includes a fruit paste, a fat, and sufficient solids to prevent significant oil migration out of the food product.

In some embodiments of a method of making a food product, matrix ingredients can include, or consist essentially of, a fruit paste, a nut butter, and a cocoa powder.

In some embodiments of a method of making a food product, the cocoa butter-based particles can be at a temperature below 20° C., or a temperature of 10° C. or less, prior to the combining step.

In some embodiments of a method of making a food product provided herein, the method can include a step of applying a dry coating to at least a portion of the surface of the pieces.

These and various other features and advantages will be apparent from a reading of the following detailed description.

BRIEF DESCRIPTION OF DRAWINGS

FIG. 1 is an image of a cross section of a food product described herein. The image shows discrete cocoa butter-based particles (chocolate) surrounded by a matrix that includes date paste, nut butter, and cocoa powder. Although the cross sectioning method caused smearing of the chocolate pieces, many of them are easily identifiable in the food product, as are nut pieces from the nut butter used and date pieces from the date paste.

DETAILED DESCRIPTION

The present disclosure describes a shelf-stable food product can be made using a combination of a fruit paste and cocoa butter-based particles that provides an eating experience resembling a chocolate truffle, a chocolate confectionery with a ganache center. During development of a shelf-stable food product, it was discovered, and is disclosed herein, that including a cocoa butter-based ingredient as particles of a particular size range, in combination with fruit paste and other simple ingredients, provided an eating experience that resembled eating a truffle, while also preventing oil migration out of the food product. Although fruit paste-based food products, such a Larabar™ and Larabar™ Bites are available, such products do not contain chocolate or other cocoa-butter based ingredients. Furthermore, Larabar™ and Larabar™ Bites did not have a mouthfeel that resembled truffles. Other products that include cocoa nibs and fruit paste present with a bitter flavor and grainy mouthfeel, rather than a truffle-like eating experience. In addition, traditional chocolate truffles have a limited shelf life. Thus, a food product disclosed herein has a previously unavailable combination of benefits of shelf stability, truffle-like texture, and ingredients that satisfy consumer expectations for ingredient simplicity.

As used herein, the term "truffle-like eating experience" refers to an eating experience similar to eating a traditional chocolate truffle, which has a ganache center. Such an eating experience includes a smooth, dry or creamy sensation upon initial bite-down followed by a quick-melting sensation in the mouth upon chewing.

As can be seen in FIG. 1, a food product provided herein includes discrete cocoa butter-based particles embedded in a matrix that includes a fruit paste, fat, and sufficient solids to prevent significant oil migration out of the food product. As used herein, the term "cocoa butter-based" refers to a composition that includes cocoa butter in an amount of at least 25% by weight (e.g., at least 30%, or from about 30% to about 40%, or from about 30% to about 35%) and has a melting point of about 31° C. to about 38° C. (e.g., from about 32° C. to about 37° C.). Cocoa butter-based particles can include additional ingredients, such as flavorants (e.g., cocoa, vanilla, and the like), sugar, and the like. Preferably, a cocoa butter-based particulate contains no artificial ingredients. Suitable cocoa butter-based particles include, for example, chocolate particles and white chocolate particles.

Cocoa butter-based particles suitable for use in a food composition provided herein have size range in which at least 90% of the particulate mass will pass through a 14 mesh sieve (1.41 mm opening) and be retained on a 140 mesh sieve (0.105 mm opening). This size range is referred to as having a size of −14+140. In some embodiments, at least 40% (e.g., at least 45%, or about 45% to about 60%) of cocoa butter-based particles are retained on an 18 mesh sieve (1.0 mm opening). In some embodiments, the size range of cocoa butter-based particles excludes particles that are retained on an 8 mesh sieve (2.38 mm opening). In some embodiments, cocoa butter-based particles can agglomerate in a food product provided herein. Agglomerates of cocoa butter-based particles can have a size larger than individual particles. However, agglomerates of cocoa-butter based particles still have a size of −14+140, but may have a larger average size than the individual particulates. In some embodiments, agglomerates of cocoa-butter based particles can exclude agglomerates that are retained on an 8 mesh sieve. Without being bound to theory, it is believed that cocoa butter-based particles in this size range contribute to a chocolate truffle-like mouthfeel, including a melt-in-your mouth sensation upon chewing due to a near body temperature melting point, while allowing the matrix to contain any significant oil migration from the particles.

Cocoa butter-based particles are included in a food product provided herein in an amount of at least 25% (e.g., from 25% to about 45%, about 35% to about 40%, or about 37% to about 39%) by weight of the food product.

Cocoa butter-based particles in a food product provided herein are embedded in a matrix that includes a fruit paste, fat, and sufficient solids to prevent significant oil migration out of the food product. The matrix of a food product provided herein comprises from about 50% to about 75% (e.g., from about 52% to about 65%) by weight of the food product.

A fruit paste suitable for use herein includes any fruit paste having a water activity of less than 0.73 (e.g., from 0.65 to 0.73, or from about 0.68 to 0.73). Examples of suitable fruit pastes include date paste, prune paste, raisin paste, apricot paste, or the like. A fruit paste is included in an amount of from about 30% to about 55% (e.g., from about 33% to about 51%) by weight of the food product, or from about 40% to about 85% (e.g., from about 44% to about 85%) by weight of the matrix.

The matrix of a food product provided herein also includes a fat and sufficient solids to prevent significant oil migration out of the food product. As used herein, oil migration is tested by placing the food product in plastic packaging and exposing the packaged food product to a 70° F. to 90° F. temperature swing, in 12 hour cycles, over a period of 12 weeks. As used herein, significant oil migration in a food product is prevented if the product does not visibly release oil into the plastic packaging after testing oil migration.

The matrix of a food product provided herein can include a fat content of from about 20% to about 32% (e.g., from about 21% to about 31%, or from about 22% to about 30%) by weight of the food product.

A fat in the matrix can be any desired edible fat, such as coconut oil, almond oil, or peanut oil, but it is preferred that at least a portion of the fat included in the matrix is provided as a component of a nut butter and/or a cocoa powder. For example, a food product provided herein can include a nut butter (e.g., almond butter, peanut butter, cashew butter, or the like) in an amount of from about 14% to about 35% (e.g., from about 15% to about 30%) by weight of the food product, or from about 18% to about 48% (e.g., from about 20% to about 40%) by weight of the matrix.

The matrix of a food product provided herein can include a cocoa powder in an amount of from about 7% to about 15% (e.g., about 8% to about 12%) by weight of the food product, or about 9% to about 25% (e.g., from about 12% to about 20%) by weight of the matrix. Any cocoa powder can be used, but it is preferred that a cocoa powder with a fat content of about 10% to about 22% (e.g., about 20% to about 22%) by weight of the cocoa powder. In some embodiments, a food product provided herein can contain a dry ingredient, such as carob powder, rather than, or in addition to, a cocoa powder. However, cocoa powder intensifies chocolate flavor in a food product, particularly where the cocoa butter-based particles used are chocolate.

In some embodiments, the matrix of a food product can comprise about 40% to about 60% by weight of a mixture consisting of fruit paste and nut butter, with the mixture being about 40% to about 70% fruit paste, and the balance of the mixture being nut butter.

Additional ingredients suitable for use in the matrix of a food product can include ingredients that provide a desirable flavor, such as salt, extracts (e.g., vanilla, mint, and the like), and inclusions (e.g., coconut pieces). In some embodiments, inclusions providing a desirable flavor can be included in an amount of up to 15% (e.g., up to about 12%, or from about 8% to about 10%) by weight of a food product.

The matrix of a food product provided herein includes sufficient solids content to prevent significant oil migration out of the food product. Solids content in the matrix can be contributed by nut butter, cocoa powder, fruit paste, and any other ingredient described above. It is preferred that the matrix does not include any added sugar, starch, fillers, or other ingredients not described above. In some embodiments, a food product provided herein can consist essentially of cocoa butter-based particles, nut butter, fruit paste, and cocoa powder. As used herein, the term "consisting essentially of" refers to less than 1% (e.g., less than 0.5%, or less than 0.2%) added ingredients.

In some embodiments, a food product provided herein can include a coating (e.g., a dry coating, a confectionary coating, or the like) as an added ingredient on the surface of the food product. A dry coating can be any suitable edible dry ingredient, such as cocoa powder, carob powder, starch, sugar (e.g., granulated or powdered), salt, nut flour or pieces (e.g., peanut granules, coconut flour, almond pieces, or the like), or the like. A dry coating can reduce adhesion of pieces of a food product provided herein. A confectionary coating can be any desired confectionary coating, such as a chocolate confection or an almond bark coating.

A food product provided herein can have a water activity that is sufficiently low to provide a stable shelf life of at least 6 months (e.g., at least 9 months). For example, a food product provided herein can have an overall water activity of 0.68 or less (e.g., 0.65 or less, or 0.6 or less).

A food product provided herein can be in any appropriate form. For example, a food product can be formed into bite-sized pieces, snack bars, or the like. In some embodiments, a food product can be portioned into pieces that are from about 5 g to about 10 g (e.g., from about 6 g to about 9 g, or about 7 g to about 8 g).

A food product provided herein can be packaged using any appropriate packaging. For example, a food product provided herein can be packaged as multiple bite-sized pieces in a bag, or individually wrapped as snack bars.

Methods

Methods of making a food product are provided herein. A method of making a food product includes combining matrix ingredients and cocoa butter-based particles to produce a food composition, in which discrete cocoa butter-based particles are embedded in a matrix comprising the matrix ingredients.

Matrix ingredients and cocoa butter-based particles can be combined using any appropriate equipment, such as a batch mixer, an extruder, or the like. However, the equipment and energy input used to combine matrix ingredients and cocoa butter-based particles should be configured such that at least some of the cocoa butter-based particles remain discrete within the matrix. That is, the combining step should be configured such that cocoa butter-based particles are not significantly melted or physically destroyed during the combining step.

In some embodiments of a method of making a food product, one or more matrix ingredient and/or cocoa butter-based particles can be kept at a temperature below 20° C. (e.g., a temperature 10° C. or less, a temperature 4° C. or less, or a temperature 0° C. or less) prior to the combining step. In some embodiments, using one or more ingredient at a temperature below 20° C. can help reduce cocoa butter-based particles from melting or being broken during the combining step.

Following the combining step, a food composition is formed into pieces to produce a food product. A food composition provided herein can be formed using any appropriate method and equipment. For example, a food composition can be cut upon exiting an extruder. In another example, a food composition can be rolled or pressed into a layer and cut into pieces. In another example, portions of a food composition can be rolled into balls using, for example, the methods and equipment disclosed in WO2017/172413.

In some embodiments, a method of making a food product can further include a step of applying a coating to at least a portion of the surface of the pieces. Application of a dry coating can be performed using any appropriate method or equipment. For example, a dry coating can be dusted on pieces carried on a conveyor. In another example, a confectionery coating can be applied using a sprayer in an enrober.

The following examples illustrate particular embodiments and are not intended to limit the claimed invention.

EXAMPLES

Example 1

Matrix ingredients according to Table 1 were briefly mixed (10 seconds×2) in a food processor fitted with a blade, then transferred to a meat grinder and combined at low speed to produce a food composition. The food composition was hand formed into spherical bites approximately 7-8 grams in weight, and coated with sea salt.

TABLE 1

| | Matrix ingredients | | | | |
|---|---|---|---|---|---|
| Sample | Almond butter (wt %) | Date paste (wt %) | Cocoa powder (wt %) | Bittersweet chocolate particles (wt %) | Sea salt coating (wt %) |
| A | 5.8 | 52.2 | 5 | 36.5 | 0.5 |
| B | 11.6 | 46.4 | 5 | 36.5 | 0.5 |
| C | 17.4 | 40.6 | 5 | 36.5 | 0.5 |
| D | 23.2 | 34.8 | 5 | 36.5 | 0.5 |
| E | 29 | 29 | 5 | 36.5 | 0.5 |
| F | 34.8 | 23.2 | 5 | 36.5 | 0.5 |
| G | 40.6 | 17.4 | 5 | 36.5 | 0.5 |
| H | 46.4 | 11.6 | 5 | 36.5 | 0.5 |
| I | 52.2 | 5.8 | 5 | 36.5 | 0.5 |
| J | 5.8 | 52.2 | 7.5 | 34 | 0.5 |
| K | 11.6 | 46.4 | 7.5 | 34 | 0.5 |
| L | 17.4 | 40.6 | 7.5 | 34 | 0.5 |
| M | 23.2 | 34.8 | 7.5 | 34 | 0.5 |
| N | 29 | 29 | 7.5 | 34 | 0.5 |
| O | 34.8 | 23.2 | 7.5 | 34 | 0.5 |
| P | 40.6 | 17.4 | 7.5 | 34 | 0.5 |
| Q | 46.4 | 11.6 | 7.5 | 34 | 0.5 |
| R | 52.2 | 5.8 | 7.5 | 34 | 0.5 |
| S | 5.8 | 52.2 | 10 | 31.5 | 0.5 |
| T | 11.6 | 46.4 | 10 | 31.5 | 0.5 |
| U | 17.4 | 40.6 | 10 | 31.5 | 0.5 |
| V | 23.2 | 34.8 | 10 | 31.5 | 0.5 |
| W | 29 | 29 | 10 | 31.5 | 0.5 |
| X | 34.8 | 23.2 | 10 | 31.5 | 0.5 |
| Y | 40.6 | 17.4 | 10 | 31.5 | 0.5 |
| Z | 46.4 | 11.6 | 10 | 31.5 | 0.5 |
| AA | 52.2 | 5.8 | 10 | 31.5 | 0.5 |

The bites were eaten to observe flavor and texture. It was found that samples A and B were too sticky to mix with the meat grinder, suggesting too high of a ratio of date paste to almond butter at lower cocoa powder concentrations resulted in stickiness. Samples G, H, I, P, Q, R, and AA were too oily to process in the meat grinder, suggesting that too high of a ratio of almond butter to date paste at lower cocoa powder content resulted in too high of an oil content in the absence of sufficient solids content.

Generally, samples having a ratio of nut butter to date paste of 30:70 to 60:40 had a texture most like a chocolate truffle, with samples O, V, and W most resembling a chocolate truffle. Samples C-F had a good texture, but the chocolate flavor was not as intense as samples with higher cocoa powder content. This suggests that for products that do not require intense chocolate flavor (e.g., vanilla bites), carob powder or other dry ingredient that can contribute solids could be used.

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A food product, comprising discrete cocoa butter-based particles in an amount of from 25% to 40% by weight of the food product, wherein the discrete cocoa butter-based particles are embedded in a matrix that includes a fruit paste having a water activity of less than 0.73, a nut butter, and cocoa powder, wherein the matrix comprises:
   fruit paste in an amount of 30% to 55% by weight of the food product;
   nut butter in an amount of 14% to 35% by weight of the food product; and
   cocoa powder in an amount of 7% to 15% by weight of the food product; wherein the discrete cocoa butter-based particles have a size range wherein at least 90% pass through a sieve with 1.41 mm openings and are retained on a sieve with 0.105 mm openings, wherein the food product provides a truffle-eating experience which includes a smooth, dry or creamy sensation upon initial bite-down followed by a quick-melting sensation in the mouth upon chewing.

2. The food product of claim 1, wherein the fruit paste is a date paste.

3. The food product of claim 1, wherein the discrete cocoa butter-based particles are chocolate.

4. The food product of claim 1, wherein the cocoa powder has a fat content of from about 10% to about 22% by weight.

5. The food product of claim 1, wherein the food product is portioned into pieces that weigh from about 5 g to about 10 g.

6. The food product of claim 1, wherein the food product further comprises a dry coating on at least a portion of the surface of the food product.

7. A food product, comprising discrete cocoa butter-based particles having a size of −14+140 embedded in a matrix that includes a fruit paste, a fat, and sufficient solids to prevent significant oil migration out of the food product, the food product consisting essentially of:
   a. the matrix, wherein the matrix consists essentially of the fruit paste, a nut butter, and cocoa powder,
   b. the discrete cocoa butter-based particles having the size of −14+140 embedded in the matrix, and
   c. a dry coating on at least a portion of the surface of the food product.

8. The food product of claim 7, wherein the fruit paste comprises a date paste.

9. The food product of claim 7, wherein the nut butter comprises almond butter or peanut butter.

10. The food product of claim 7, wherein the cocoa butter-based particles are chocolate.

11. The food product of claim 7, wherein the dry coating comprises carob powder, cocoa powder, powdered sugar, a starch, a nut flour, or any combination thereof.

12. A method of making a food product comprising:
   a. combining matrix ingredients and cocoa butter-based particles to form a food composition, and
   b. forming the food composition into pieces to produce the food product, the food product comprising discrete cocoa butter-based particles in an amount of from 25% to 40% by weight of the food product embedded in a matrix that includes a fruit paste having a water activity of less than 0.73, a nut butter, and cocoa powder, wherein the matrix comprises:
   fruit paste in an amount of 30% to 55% by weight of the food product;
   nut butter in an amount of 14% to 35% by weight of the food product; and
   cocoa powder in an amount of 7% to 15% by weight of the food product; wherein the discrete cocoa butter-based particles have a size range wherein at least 90% pass through a sieve with 1.41 mm openings and are retained on a sieve with 0.105 mm openings, wherein the food product provides a truffle-eating experience which includes a smooth, dry or creamy sensation upon initial bite-down followed by a quick-melting sensation in the mouth upon chewing.

13. The method of claim 12, wherein the cocoa butter-based particles are at a temperature below 20° C. prior to the combining step.

14. The method of claim 13, wherein the cocoa butter-based particles are at a temperature of 10° C. or less prior to the combining step.

15. The method of claim 12, further comprising a step of applying a dry coating to at least a portion of the surface of the pieces.

16. The food product of claim 1, wherein the fruit paste comprises a date paste.

17. The food product of claim 1, wherein the nut butter comprises almond butter or peanut butter.

18. The food product of claim 1, wherein the discrete cocoa butter-based particles have a size range wherein at least 40% are retained on a sieve with 1.0 mm openings.

* * * * *